(12) United States Patent
Thompson

(10) Patent No.: US 12,325,495 B1
(45) Date of Patent: Jun. 10, 2025

(54) BOAT SEAT WITH INTEGRATED ROD AND BEVERAGE HOLDERS

(71) Applicant: Joseph Thompson, Saint James City, FL (US)

(72) Inventor: Joseph Thompson, Saint James City, FL (US)

( * ) Notice: Subject to any disclaimer, the term of this patent is extended or adjusted under 35 U.S.C. 154(b) by 0 days.

(21) Appl. No.: 19/078,507

(22) Filed: Mar. 13, 2025

(51) Int. Cl.
*B63B 29/04* (2006.01)
*A01K 97/10* (2006.01)
*B63B 17/00* (2006.01)

(52) U.S. Cl.
CPC .............. *B63B 29/04* (2013.01); *A01K 97/10* (2013.01); *B63B 17/00* (2013.01); *B63B 2029/043* (2013.01)

(58) Field of Classification Search
CPC .... B63B 29/04; B63B 17/00; B63B 2029/043
See application file for complete search history.

(56) References Cited

U.S. PATENT DOCUMENTS

| | | | | |
|---|---|---|---|---|
| 1,651,953 A | * | 12/1927 | Hayden ................... | H04B 1/086 455/343.1 |
| 4,645,167 A | * | 2/1987 | Hardwick ............... | B63B 29/04 248/283.1 |
| 9,532,559 B1 | * | 1/2017 | Hemmerlin ............ | F16M 13/02 |
| 9,677,594 B1 | * | 6/2017 | Hemmerlin ............ | F16M 13/02 |
| 10,405,531 B1 | * | 9/2019 | Denmark ................ | A01K 97/04 |
| 10,588,305 B2 | * | 3/2020 | Larkin ...................... | B60R 7/08 |
| 2007/0283614 A1 | * | 12/2007 | Kessler ................... | A01K 97/10 43/21.2 |
| 2018/0110335 A1 | * | 4/2018 | O'Hagan ................ | A47C 7/66 |

* cited by examiner

*Primary Examiner* — S. Joseph Morano
*Assistant Examiner* — Jovon E Hayes
(74) *Attorney, Agent, or Firm* — Dale J. Ream

(57) ABSTRACT

A rod and beverage holding apparatus includes a holding assembly having a body member operatively coupled to a boat seat post—either directly or via a length adjustment assembly. The holding assembly may include a generally planar body member that defines a beverage holding structure having a cylindrical or conical configuration for receiving a cup or can. The apparatus includes a rod holder assembly fixedly attached to the holding assembly and has a cylindrical configuration for receiving and holding a fishing rod. The body member of the holding assembly may include a rear section having a hollow interior area for holding personal items. The apparatus includes length and height adjustment assemblies so that the beverage, rod, and phone holding assemblies may be adjusted in unison.

15 Claims, 4 Drawing Sheets

BOAT SEAT WITH INTEGRATED ROD AND BEVERAGE HOLDERS

BACKGROUND OF THE INVENTION

This invention relates generally to fishing accessories, boat accessories, and organizational devices and, more particularly, to a holding apparatus that may be coupled directly to a custom boat seat and which integrates a rod holder, beverage holder, and telephone holder. The holding apparatus may be length and height adjustable to maximize accessibility by persons of any size who may be sitting in the boat seat.

Fishing from a boat offers an unparalleled experience of relaxation, excitement, and the thrill of the catch. The ability to access deeper waters, move to different fishing spots, and enjoy a peaceful day on the water makes boat fishing highly desirable. However, for an optimal fishing experience, certain essential accessories must be in place to enhance convenience and efficiency.

One crucial necessity is a rod holder, which serves the important function of securely holding a fishing rod when it is unattended. Whether waiting for a bite or needing both hands free for other tasks, a rod holder ensures that the fishing rod remains steady and positioned correctly without the risk of falling overboard or getting tangled. This is especially beneficial when managing multiple lines or engaging in hands-free activities such as bait preparation or navigation.

Equally important is a beverage holder to secure a cup or can, allowing for easy access to refreshments while fishing. A stable and conveniently placed beverage holder prevents spills and ensures that drinks remain within reach, enhancing comfort during long hours on the water. Hydration and refreshment are key to maintaining focus and enjoyment during a fishing trip.

In one embodiment, an additional holding assembly for securing personal belongings such as a cell phone, wallet, or keys is highly desirable. These valuable items need a dedicated space to prevent them from being misplaced, damaged, or lost overboard. A well-designed holding assembly provides a safe and organized solution for keeping essential personal items within easy reach.

To further enhance convenience and usability, it is advantageous to have all these holding assemblies connected as a single module. This integration prevents the components from becoming separated or lost while also ensuring easy installation and accessibility. Additionally, incorporating length and height adjustability relative to a custom boat seat allows users to tailor the module to their specific needs, maximizing comfort and efficiency.

By incorporating these essential accessories into a unified, adjustable system, boat fishing can become even more enjoyable, allowing anglers to focus on their craft while keeping their essential tools and refreshments within arm's reach.

SUMMARY OF THE INVENTION

Accordingly, a rod and beverage holding apparatus according to the present invention includes a holding assembly having a body member operatively coupled to a boat seat post—either directly or via a length adjustment assembly. The holding assembly may include a generally planar body member that defines a beverage holding structure having a cylindrical or conical configuration for receiving a cup or can. The apparatus may also include a rod holder assembly fixedly attached to the holding assembly and having a cylindrical configuration suitable for receiving and holding a fishing rod. The body member of the holding assembly may include a rear section having a hollow interior area for holding a fisherman's wallet, cell phone, keys, etc.

In another aspect, the rod and beverage holding apparatus may include a height adjustment assembly fixedly attached to the length adjustment assembly, the height adjustment assembly including a collar that is vertically and slidably movable along a boat seat post. It is understood that both length and height adjustment assemblies may include knob fasteners so as to be selectively deployed or secured.

In a critical aspect, the length and height adjustment assemblies enable the beverage, rod, and phone holding assemblies to be adjusted in unison. In other words, all of the holding assemblies may be adjusted simultaneously.

Therefore, a general object of this invention is to provide a rod and beverage holding apparatus, that provides the most important holding devices in a single integrated unit that is physically coupled to a boat seat post of a fishing boat.

Another object of this invention is to provide a rod and beverage holding apparatus, as aforesaid, that provides a beverage assembly, a rod holding assembly, and a mobile telephone assembly in a cumulative holding apparatus of a fishing boat.

Still another object of this invention is to provide a rod and beverage holding apparatus, as aforesaid, that is length adjustable and height adjustable relative to a custom boat seat.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from FIG. 1a;

DESCRIPTION OF THE PREFERRED EMBODIMENT

Figure 1A:
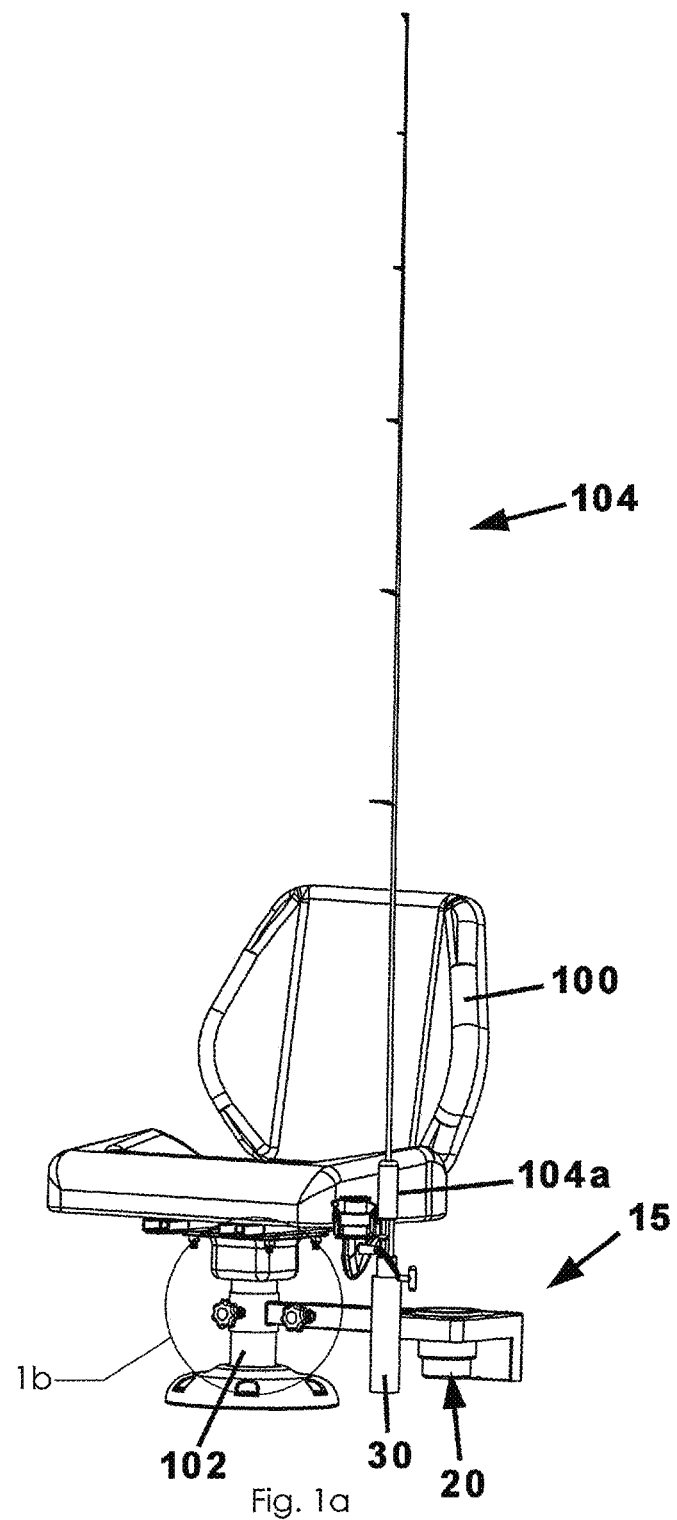
FIG. 1a is a perspective view of a rod and beverage holding apparatus for a boat according to the present invention, illustrated installed on a boat seat.
Figure 1B:
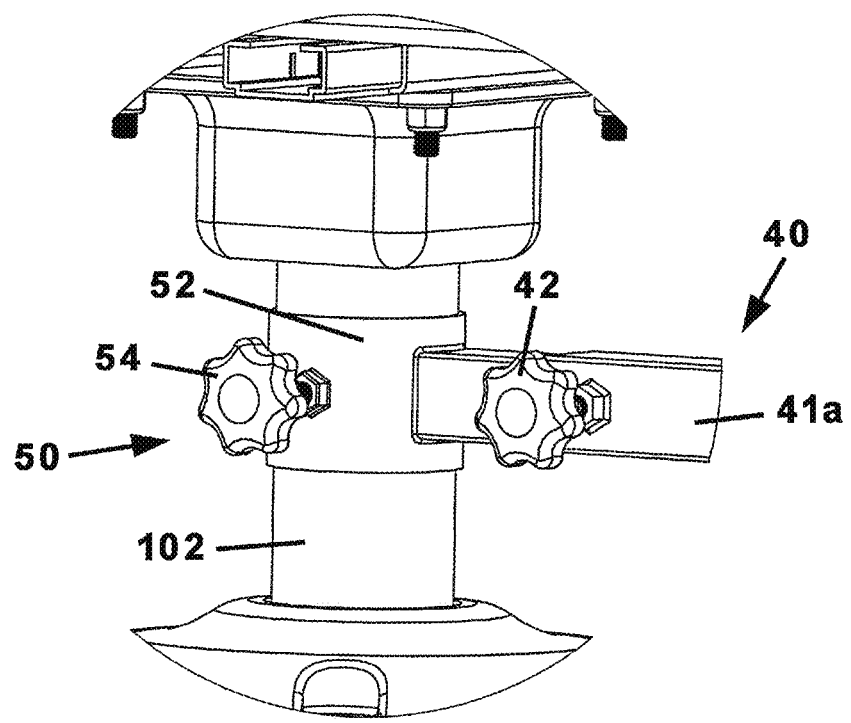

A fishing rod and beverage holding apparatus that is integrally coupled to a custom fishing boat seat according to a preferred embodiment of the present invention will now be described with reference to the accompanying drawings. The holding apparatus 10 may include a holding assembly 15 that defines a beverage holding assembly 20, a rod holding assembly 30, a rear section 40 for holding a phone, a length adjustment assembly 50, and a height adjustment assembly 60.

Figure 2:
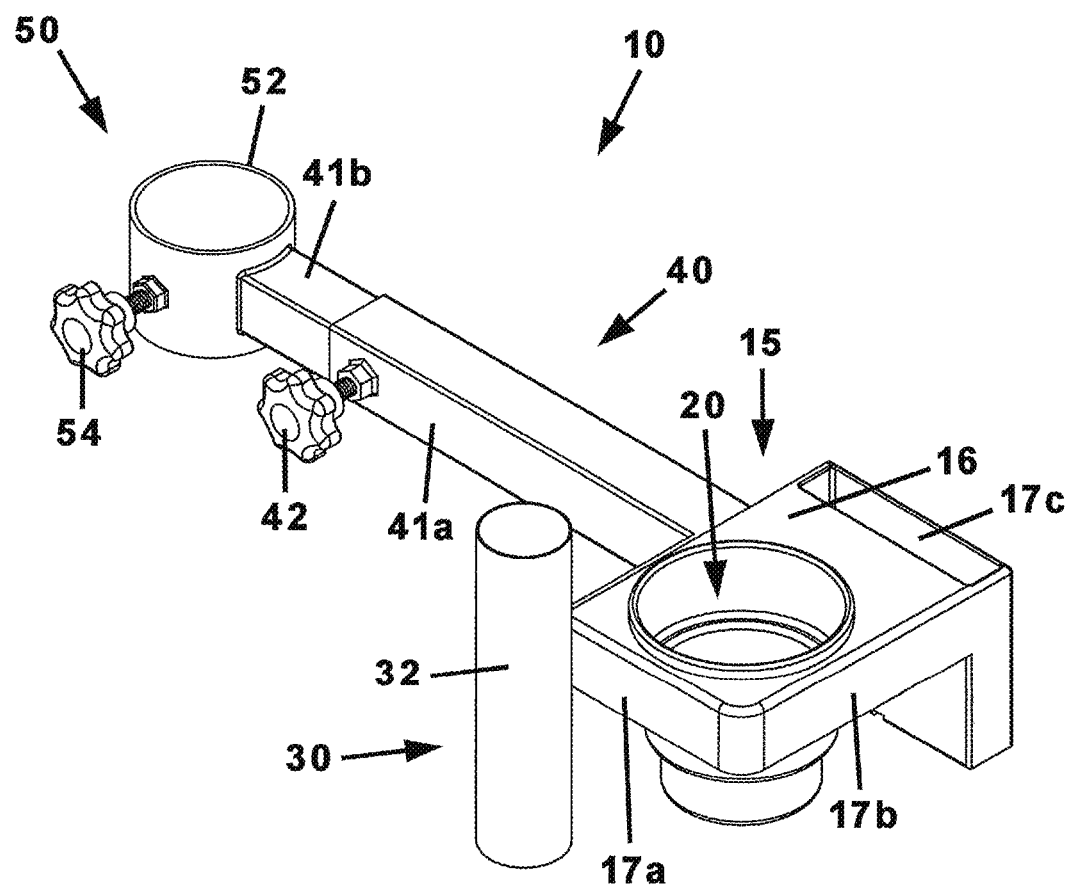
FIG. 2 is a perspective view of the rod and beverage holding apparatus according to the present invention.

The rod and beverage holding apparatus 10 is advantageous because it mandates that certain critical assemblies are kept proximate and adjustable with respect to a custom boat seat 100 and post 102 mounted to a floor of a boat. First, the primary component of the present invention is the holding assembly 15 that includes a body member 16 (FIG. 2). The body member 16 may have a generally planar or flat configuration and may provide the structure to which other assemblies are attached and may define other configurations that will be explained later.

Structurally, the body member 16 may include a front section 17a, a pair of side walls 17b extending rearwardly from the front section 17a, and a rear section 17c that is opposite the front section 17a and that extends between distal ends of the pair of side walls 17b. The front section may also be referred to as a front wall. Similarly, the body member 16 may have a shape configuration other than what is described or shown and may be thinner or thicker as determined by the manufacturer.

In a critical aspect, the holding apparatus 10 according to the present invention includes a beverage holding structure 20 (also referred to as a beverage holding assembly). The beverage holding structure 20 may include a continuous sidewall having a cylindrical or conical configuration, the continuous sidewall being arranged so as to define an open top in communication with an open interior space configured to receive a beverage cup or can. In other words, the continuous sidewall extends downwardly and through the surface of the body member 16 or, stated another way, the body member 16 defines an aperture through which the continuous sidewall extends through in the nature of a through-bore. As shown, the body member 16 includes a flat surface that defines a horizontal plane whereas the beverage holding structure 20 defines a longitudinal axis that is perpendicular to the horizontal plane. Preferably, the beverage holding apparatus 20 includes a bottom for supporting a beverage cup or can.

In another critical aspect, the rod and beverage holding apparatus 10 may include a rod holding assembly 30 situated adjacent to the beverage holding structure 20 and, preferably, coupled to the body member 16. As shown, the rod holding assembly 30 may be fixedly attached or mounted to the front wall or front section 17a of the body member 16 (FIG. 2). More particularly, the rod holding assembly 30 may have a closed bottom wall 31 and a continuous sidewall 32 extending upwardly from peripheral edges of the bottom wall 31. The continuous sidewall 32 defines a hollow interior space, upper edges of the continuous sidewall 32 defining an open top through which the interior space may be accessed. In use, a user may insert the rod 104 or at least the rod handle 104b into the hollow interior space of the rod holding assembly 30.

In an embodiment, the body member 16 may define an area into which a user may store his telephone, wallet, keys, or other personal items. More particularly, the rear section 17c described above is coupled to a rearward edge of the body member 16 or, preferably, has a unitary construction with the body member 16. Preferably, the rear section 17c defines a vertical plane that is adjacent and parallel to an imaginary longitudinal axis defined by the continuous sidewall of the beverage holding assembly 20. The rear section 17c may have a generally rectangular configuration and maybe referred to as a pocket, the rear section 17c having a plurality of walls and a closed bottom so as to define an open interior area in communication with and accessed via an open top.

Figure 3:
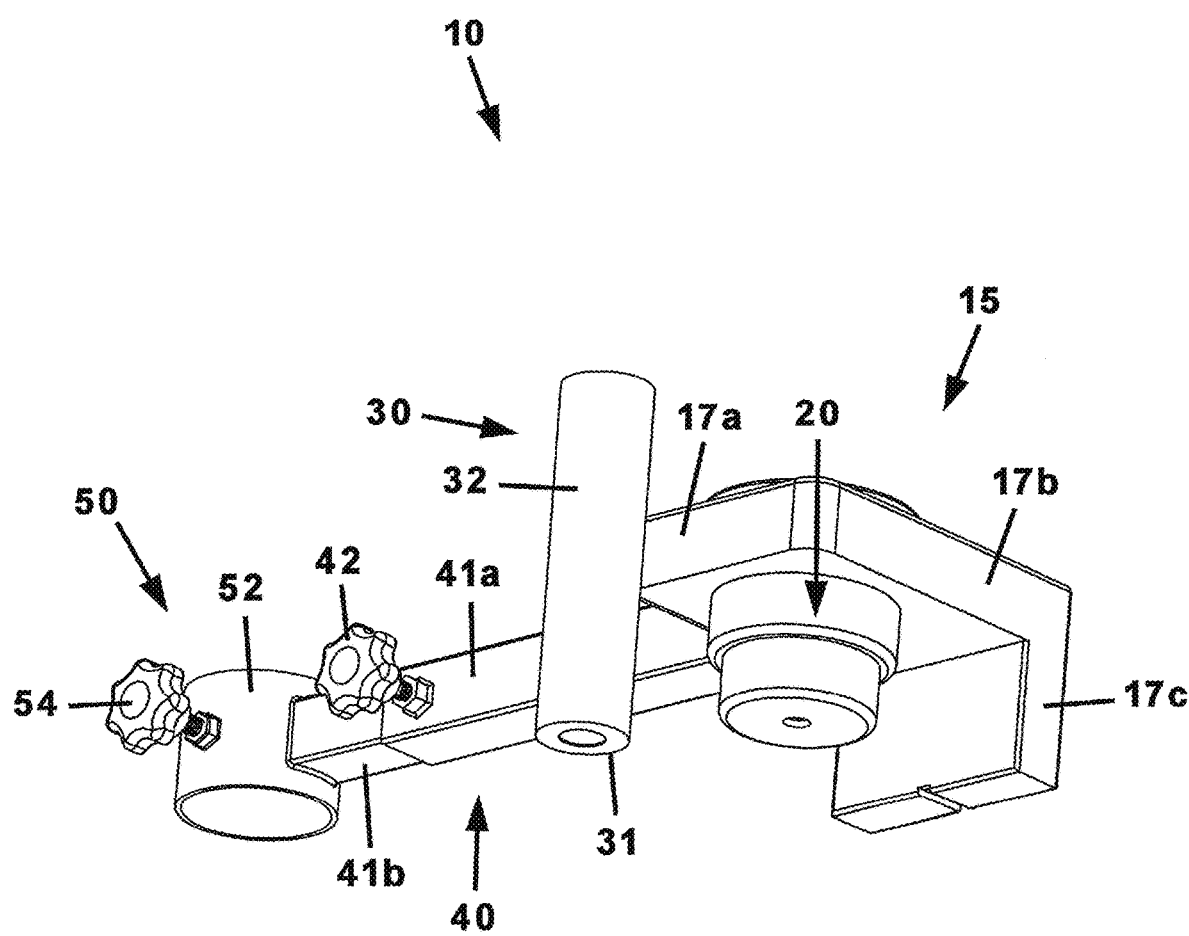
FIG. 3 is another perspective view taken from a lower angle of the rod and beverage holding apparatus as in FIG. 2.

It is understood that the lower or bottom walls of the assemblies described above may define one or more openings, respectively, so that water or other spillage will drain naturally by way of gravity (FIG. 3).

In another important aspect, the holding assembly 15 may be operatively coupled to the post 102 on which the boat seat 100 is mounted. By articulating a length adjustment assembly 40, the holding assembly 15 may be moved laterally closer to the boat seat 100 or farther away from the boat seat 100. More particularly, the length adjustment assembly 40 includes a first sleeve 41a defining an open or hollow interior area having a configuration and a second sleeve 41b having a dimension and configuration for slidable insertion or removal from the first sleeve 41a. The first sleeve 41a may have a first end fixedly attached to a respective side wall of the body member 16 such that the body member 16 will move correspondingly with length adjustment of the length adjustment assembly 40. The first sleeve 41a includes a second end that is open and in communication with the hollow interior area through which the second sleeve 41b is movable.

The length adjustment assembly 40 may include a fastener 42 that is configured to secure and prevent movement of the second sleeve 41b relative to the first sleeve 41a. In an embodiment, the fastener may be a knob having a stem configured to move threadably through a wall of the first sleeve 41a as the knob is rotated so as to tighten or loosen the second sleeve 41b.

As shown, the second sleeve 41b is operably coupled to a post 102 atop which the boat seat 100 is mounted, the post 102 extending upwardly from its mounted position to a floor of a boat. More particularly, the leading end of the second sleeve 41b may be fixedly attached (such as by welding) to a collar 52 of the height adjustment assembly 50.

In another aspect, the height adjustment assembly 50 may include a collar 52 which may be fixedly attached to the second sleeve 41b as described above. Further, the collar 52 may be mounted to the post 102 and may be movable vertically there along so as to adjust the height of the entire assembly simultaneously. In other words, as the collar 52 is moved upwardly along the post 104, the length adjustment assembly 40 and the entire holding assembly 15 is correspondingly lifted upwardly. Conversely, as the collar 52 is moved downwardly along the post 102, the length adjustment assembly 40 and the entire holding assembly 15 is correspondingly lowered.

Geometrically, the length adjustment assembly 40 facilitates lateral movement along an imaginary longitudinal axis that is parallel to the ground and be slidably movable between extended and retracted configurations. By contrast, post 104 defines an upstanding or vertical axis that is perpendicular to the longitudinal axis defined by the length adjustment assembly 40. The height adjustment assembly 50 may also include a fastener 54, such as a knob fastener having a stem threadably inserted through the collar 52 for selectively bearing against the post 104. Accordingly, the collar 52 may be loosened to allow the collar 52 to move upwardly or downwardly along the post 102 and be tightened so as to secure the height adjustment.

In use, the rod and beverage holding apparatus 10 is installed on a boat of a type having a post 102 atop which a boat seat 100 is mounted by operably coupling the collar 52 to the post 102. Until the fastener 54 is tightened, the collar 52 is free to move slidably up or down so as to adjust a height of the apparatus as a whole. Similarly, fastener 42 may be loosened to allow slidable lateral adjustment of the first and second sleeves 41a, 42a—this movement causing the entire holding assembly 15 to move closer to or further away from the boat seat 100. Once installed, the holding apparatus 10 is ready for use. Specifically, a fisherman may store his phone, wallet, other personal items into the rear section holding area, a cup or can of a preferred beverage may be received by the beverage holding structure 20, and a handle of one's fishing rod may be inserted into the rod holding assembly 30 as described above.

It is understood that while certain forms of this invention have been illustrated and described, it is not limited thereto except insofar as such limitations are included in the following claims and allowable functional equivalents thereof.

What is claimed is:

1. A rod and beverage holding apparatus for mounting to a seat post that extends upwardly from a floor of a boat, said rod and beverage holding apparatus comprising:
   a holding assembly having a body member operatively coupled to the seat post and that includes (1) a front wall, (2) a pair of side walls extending rearwardly from opposed ends of the front wall, and (3) a rear section situated between distal ends of the pair of side walls;
   wherein said body member includes a beverage holding structure that has a continuous sidewall extending downwardly through and away from the body member, the continuous sidewall defining an open top and an open interior space accessible via said open top; and
   a rod holding assembly having a continuous sidewall that has a tubular configuration that defines an open top and a hollow interior space, said continuous sidewall being operatively coupled to the body member of the holding assembly and having a bottom wall that is closed.

2. The rod and beverage holding apparatus as in claim 1, further comprising a length adjustment assembly that includes a first sleeve having a first end fixedly attached to said holding assembly and a second end opposite said first end, said first sleeve defining an open interior area, said length adjustment assembly including a second sleeve selectively received in the open interior area of said first sleeve that is slidably movable in or out of the open interior area.

3. The rod and beverage holding apparatus as in claim 2, wherein said length adjustment assembly includes a knob fastener for incrementally allowing or preventing slidable movement of said second sleeve in said open interior area, respectively.

4. The rod and beverage holding apparatus as in claim 2, further comprising a height adjustment assembly that includes a collar (1) fixedly attached to a free end of said second sleeve of said length adjustment assembly and (2) slidably mounted to the seat post that extends upwardly from the floor of the boat and that defines an imaginary longitudinal axis, said collar being slidably movable along the seat post and having a fastener for selectively securing or releasing said collar to said seat post.

5. The rod and beverage holding apparatus as in claim 1, further comprising a height adjustment assembly that includes a collar (1) operatively coupled to said holding assembly and slidably movable along the seat post, said height adjustment assembly including a fastener for selectively securing or releasing said collar to said seat post.

6. The rod and beverage holding apparatus as in claim 1 wherein:
   said rear section has an open top and defines an open interior area in communication with said open top; and
   said rear section includes a plurality of side walls extending downwardly from said open top and a bottom wall that is closed.

7. The rod and beverage holding apparatus as in claim 1, wherein said rod holding assembly is fixedly mounted to the front wall of the body member and is situated adjacent said beverage holding structure.

8. The rod and beverage holding apparatus as in claim 1, wherein:
   said beverage holding structure includes a bottom wall defining an aperture for selectively draining water from said open interior space; and
   said bottom wall of said rod holding assembly defines an opening for selectively draining water from said hollow interior space.

9. The rod and beverage holding apparatus as in claim 1, wherein said beverage holding structure and said rod holding assembly define imaginary longitudinal axes, respectively, that are coplanar and parallel to one another.

10. The rod and beverage holding apparatus as in claim 1, wherein said beverage holding structure and said rear section of said body member have a unitary construction.

11. A rod and beverage holding apparatus for mounting to a seat post that extends upwardly from a floor of a boat, said rod and beverage holding apparatus comprising:
    a holding assembly has a body member having a generally planar configuration and that includes (1) a front section, (2) a pair of side walls extending rearwardly from the front section, and (3) a rear section opposite the front section,
    wherein said holding assembly includes a beverage holding structure situated between said front and rear sections and that has a continuous sidewall having a conical-shaped configuration extending downwardly through and away from the body member, the continuous sidewall defining an open top and an open interior space accessible via said open top;
    a length adjustment assembly that includes a first sleeve having a first end fixedly attached to said holding assembly and a second end opposite said first end, said first sleeve defining an open interior area, said length adjustment assembly including a second sleeve selectively received in the open interior area of said first sleeve that is slidably movable in or out of the open interior area;
    a height adjustment assembly that includes a collar (1) fixedly attached to a free end of said second sleeve of said length adjustment assembly and (2) slidably mounted to the seat post that extends upwardly from the floor of the boat and that defines an imaginary longitudinal axis, said collar being slidably movable along the seat post and having a fastener for selectively securing or releasing said collar to said seat post; and
    a rod holding assembly having a closed bottom wall and a continuous wall extending upwardly from said closed bottom wall so as to define a tubular configuration that defines an open top and a hollow interior space, said continuous wall being fixedly attached to said front section of said body member of the holding assembly.

12. The rod and beverage holding apparatus as in claim 11 wherein:
    said rear section has an open top and defines an open interior area in communication with said open top; and
    said rear section includes a plurality of side walls extending downwardly from said open top and a bottom wall that is closed.

13. The rod and beverage holding apparatus as in claim 12, wherein said length adjustment assembly includes a knob fastener for incrementally allowing or preventing slidable movement of said second sleeve in said open interior area, respectively.

14. The rod and beverage holding apparatus as in claim 13, wherein said beverage holding structure and said rod holding assembly define imaginary longitudinal axes, respectively, that are coplanar and parallel to one another.

15. The rod and beverage holding apparatus as in claim 11, wherein said beverage holding structure and said rear section of said body member have a unitary construction.

* * * * *